(12) United States Patent
Xie et al.

(10) Patent No.: US 12,298,906 B2
(45) Date of Patent: May 13, 2025

(54) BULK MEMORY INITIALIZATION

(71) Applicant: Huawei Technologies Co., Ltd., Shenzhen (CN)

(72) Inventors: Yuejian Xie, Sunnyvale, CA (US); Qian Wang, Santa Clara, CA (US); Xingyu Jiang, Palo Alto, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 17/902,263

(22) Filed: Sep. 2, 2022

(65) Prior Publication Data
US 2023/0004493 A1 Jan. 5, 2023

Related U.S. Application Data

(63) Continuation of application No. PCT/US2020/021153, filed on Mar. 5, 2020.

(51) Int. Cl.
*G06F 12/0811* (2016.01)
*G06F 12/1009* (2016.01)

(52) U.S. Cl.
CPC ...... *G06F 12/0811* (2013.01); *G06F 12/1009* (2013.01)

(58) Field of Classification Search
None
See application file for complete search history.

(56) References Cited

U.S. PATENT DOCUMENTS

| 5,835,704 A | 11/1998 | Li et al. |
| 7,711,897 B1 * | 5/2010 | Chatterjee ............. G06F 3/0605 711/170 |
| 9,804,793 B2 | 10/2017 | Tomishima et al. |
| 2006/0136682 A1 * | 6/2006 | Haridas .................... G11C 7/20 711/154 |
| 2016/0217080 A1 * | 7/2016 | Solihin ............... G06F 12/0837 |
| 2018/0165199 A1 * | 6/2018 | Brandt ................ G06F 12/1009 |
| 2018/0239702 A1 * | 8/2018 | Farmahini Farahani .................... G06F 12/0813 |

OTHER PUBLICATIONS

"AMBA AXI and ACE Protocol Specification: AXI3, AXI4, and AXI4-Lite, ACE and ACE-Lite," ARM, Oct. 2011, 306 pages.
"AMBA 5 CHI Architecture Specification," ARM, May 2018, 390 pages.

(Continued)

*Primary Examiner* — Stephanie Wu
(74) *Attorney, Agent, or Firm* — Pearl Cohen Zedek Latzer Baratz LLP

(57) ABSTRACT

The disclosure relates to technology for bulk initialization of memory in a computer system. The computer system comprises a processor core comprising a load store unit and a last level cache in communication with the processor core. The last level cache is configured to receive bulk store operations from the load store unit. Each bulk store operation includes a physical address in the memory to be initialized. The last level cache is configured to send multiple write transactions to the memory for each bulk store operation to perform a bulk initialization of the memory for each bulk store operation. The last level cache is configured to track status of the bulk store operations.

18 Claims, 12 Drawing Sheets

(56) References Cited

OTHER PUBLICATIONS

Seshadri, Vivek, et al., "RowClone: Fast and Energy-Efficient In-DRAM Bulk Data Copy and Initialization," MICRO-46, Dec. 2013, 13 pages.

Mutlu, Onur, et al., "Processing Data Where It Makes Sense: Enabling In-Memory Computation," [https://arxiv.org/abs/1903.03988], Mar. 2019, 21 pages.

International Search Report & The Written Opinion of the International Searching Authority dated Dec. 8, 2020, International Application No. PCT/US2020/021153.

* cited by examiner

BULK MEMORY INITIALIZATION

CLAIM OF PRIORITY

This application is a continuation of PCT Patent Application No. PCT/US2020/021153, entitled "BULK MEMORY INITIALIZATION", filed Mar. 5, 2020, the entire contents of which is hereby incorporated by reference.

FIELD

The disclosure generally relates to memory initialization in a computing system.

BACKGROUND

Data movement is becoming a greater performance bottleneck in modern processors. To perform any operation on data that resides in main memory, a central processing unit (CPU) first issues a series of commands to the main memory (e.g., DRAM modules) across an off-chip bus that is commonly referred to as a memory channel. The main memory responds by sending the data to CPU, after which the data is placed within a cache. This process of moving data from the main memory to the CPU incurs a long latency, and consumes a significant amount of energy.

Memory initialization is a process of establishing known values in the memory. Initialization of a region of memory could occur in response to an allocation of that region to, for example, a computer program or operating system. In some cases, memory is initialized to all zeroes. Initializing main memory is generally decomposed into a series of store instructions. Each store instruction may initialize a small region of main memory. For example, each store instruction may initialize a region of main memory that is the size of a cache line. The series of store instructions may be executed in CPU execution unit. Each store instruction may fetch a cache line into a cache, modify the cache line and write the cache line to the main memory. In those operations, the caches are not properly leveraged if the line brought into the caches are not reused later by the CPU.

BRIEF SUMMARY

According to one aspect of the present disclosure, there is provided a computer system for initializing memory. The computer system comprises a processor core comprising a central processing unit (CPU), a load store unit, and an internal cache. The computer system comprises a last level cache in communication with the processor core. The last level cache is configured to receive bulk store operations from the load store unit. Each bulk store operation includes a physical address in the memory to be initialized. The last level cache is configured to send multiple write transactions to the memory for each bulk store operation to perform a bulk initialization of the memory for each bulk store operation. The last level cache is configured to track status of the bulk store operations.

Optionally, in any of the preceding aspects, the last level cache is further configured to maintain cache coherence in a hierarchy of caches in the computer system when performing the bulk initialization of the memory for each bulk store operation.

Optionally, in any of the preceding aspects, the load store unit comprises a bulk store combine buffer, and the load store unit is configured to store status of the bulk store operations in the bulk store combine buffer.

Optionally, in any of the preceding aspects, the load store unit is further configured to send the bulk store operations directly to the last level cache while bypassing the internal cache.

Optionally, in any of the preceding aspects, the load store unit is further configured to track bulk store operations that are pending. Each bulk store operation is associated with a region of the memory to be initialized. The load store unit is further configured to block younger loads associated with any region of the memory associated with any pending bulk store operation.

Optionally, in any of the preceding aspects, the load store unit is configured to either set pending status for a bulk store operation to complete or remove the bulk store operation from the bulk store combine buffer in response to the last level cache indicating that the bulk store operation is complete.

Optionally, in any of the preceding aspects, the last level cache is further configured to store information on intact status associated with each bulk store operation. The intact status indicates whether a region of the memory initialized by a bulk store operation is intact with initialization values. The last level cache is further configured to set the intact status to not intact responsive to another processor core writing to a region of the memory associated with a bulk store operation.

Optionally, in any of the preceding aspects, the load store unit is further configured to invalidate an entry for a first bulk store operation in the bulk store combine buffer responsive to the intact status indicating that the status is not intact. The load store unit is further configured to maintain a corresponding entry for a second bulk store operation as a valid entry in the bulk store combine buffer responsive to the intact information indicating that the status is intact.

Optionally, in any of the preceding aspects, the load store unit is further configured to respond to a younger load instruction that loads from a region of the memory initialized by a bulk store operation that is complete by providing known initialization values if the region is still intact.

Optionally, in any of the preceding aspects, each bulk store operation initializes a region of the memory to all zeroes.

Optionally, in any of the preceding aspects, each write transaction initializes a region of the memory that has a size of a cache line.

Optionally, in any of the preceding aspects, each bulk store operation initializes a region of the memory that has a size of a page.

Optionally, in any of the preceding aspects, the computer system further comprises logic configured to create a single bulk store operation from a plurality of store instructions that each are configured to initialize a cache line sized region in the memory.

According to one other aspect of the present disclosure, there is provided a method of initializing memory in a computer system. The method comprises receiving, at a last level cache in a hierarchy of caches in the computer system, a bulk store operation from a load store unit in a processor core in the computer system. The method comprises performing a bulk initialization of the memory for each bulk store operation, including sending multiple write transactions from the last level cache to the memory for each bulk store operation. The method comprises tracking status of the bulk store operations.

According to still one other aspect of the present disclosure, there is provided a computer system for initializing memory. The computer system comprises main memory, a central processing unit, a load store unit, and a hierarchy of caches comprising a last level cache. The load store unit comprises load store unit means for tracking status of page store operations. Each page store operation includes a physical address in the main memory. The last level cache comprises means for sending multiple write transactions to the main memory for each page store operation to initialize a page of the main memory. The last level cache comprises last level cache means for tracking status of the page store operations and reporting the status to the load store unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to bulk initialization of memory in a computing system. Bulk initialization of memory, as the term is used herein, refers to initializing a region of memory that is larger than a cache line in size. A cache line is a basic unit for cache storage and may also be referred to as a cache block. As one example, bulk initialization may be used to initialize a region that is four kilobytes in size (herein, a kilobyte is defined as 1024 bytes). In one embodiment, a load store unit in a processor core sends a bulk store operation to a last level cache. The last level cache is configured to send multiple write transactions to the memory for each bulk store operation in order to perform a bulk initialization of the memory. The last level cache is configured to track status of the bulk store operation. The last level cache is configured to maintain cache coherence in a hierarchy of caches when performing the bulk initialization of the memory for each bulk store operation. The bulk store operation may eliminate the need to have numerous store transactions at the load store unit, which saves considerable time. The bulk store operation may eliminate the need to transfer a series of store transactions over the cache hierarchy, thereby saving considerable time. The bulk store operation may reduce or eliminate the need to cache data in the cache hierarchy when performing bulk initialization of the memory, thereby saving considerable time and reducing complexity.

In one embodiment, the load store unit has a bulk store combine buffer configured to hold status of the bulk store operations. The last level cache may report status of the bulk store operations to the load store unit. In one embodiment, the load store unit blocks younger loads associated with any region of the memory associated with any pending bulk store operation.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
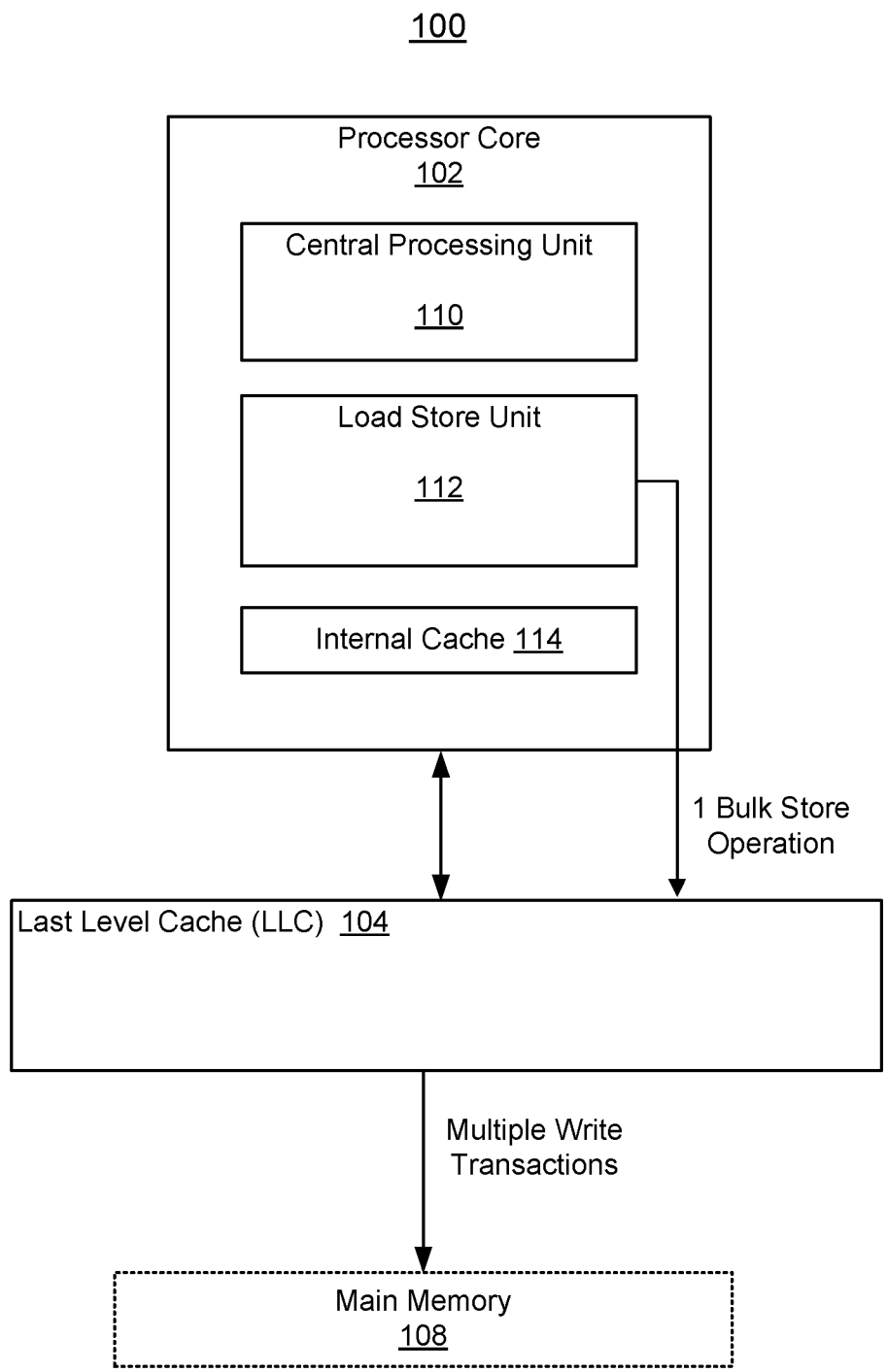
FIG. 1A is a block diagram of one embodiment of a computing system that may perform bulk initialization of memory.

FIG. 1A is a block diagram of one embodiment of a computing system 100. The computing system 100 is configured to perform bulk initialization of memory. The computing system 100 includes a processor core 102, a last level cache (LLC) 104, and main memory 108. The main memory 108 is optional. In one embodiment, the main memory 108 is volatile memory, such as DRAM or SRAM. However, the main memory 108 is not required to be volatile memory.

The processor core 102 contains at least one central processing unit (CPU) 110, a load store unit (LSU) 112, and internal cache 114. The term internal cache 114 refers to cache that is on the same semiconductor die (chip) as the CPU 110. In one embodiment, the internal cache 114 contains an L1 cache and an L2 cache. Thus, the internal cache 114 may include more than one level of caches. A computing system may use a cache to improve computing performance. For instance, a computing system may store data that it needs to access more frequently in a smaller, faster cache memory instead of storing the data in a slower, larger memory (e.g., main memory 108).

The computing system 100 has a hierarchy of caches that are ordered in what are referred to herein as cache levels. Typically, the cache levels are numbered from a highest level cache to lowest level cache. There may be two, three, four, or even more levels in the cache hierarchy. Herein, a convention is used to refer to the highest level cache with the lowest number, with progressively lower levels receiving progressively higher numbers. For example, the highest level cache in the hierarchy may be referred to as L1 cache. Here, the lower level cache levels may be referred to as L2 cache, L3 cache, L4 cache, etc. In one embodiment, the internal cache 114 has L1 cache, which is a small, fast cache near the central processing unit 110. The lowest level cache is referred to as a last level cache (LLC) 104.

In one embodiment, the computing system 100 performs a bulk initialization of main memory 108. In some conventional techniques, a processor core 102 initializes main memory 108 by sending commands to initialize cache line size regions of main memory 108. In one embodiment, the processor core 102 sends a single bulk store operation to the last level cache 104 in order to initialize a large region in main memory 108. As one example, the region could be four kilobytes in size. In one embodiment, the bulk store operation is used to initialize a region that has the size of page. Herein, a page is defined as the smallest unit of data for memory management in a virtual address space. A page is typically described by a single entry in a page table. A page could be the equivalent of, for example, 64 cache lines. Thus, the processor core 102 sends one bulk store operation instead of 64 store transactions, as one example. Moreover, the load store unit 112 may send the bulk store operation directly to the last level cache 104, bypassing the internal cache 114 (e.g., L1 cache, L2 cache) in the processor core 102. Bypassing the internal cache 114 improves efficiency. The bulk store operation may be referred to as a page store operation when the region of memory that is initialized is a page in size. In general, the bulk store operation is used to initialize a region of memory that is multiple cache lines in size.

The last level cache 104 forms multiple write transactions from one bulk store operation. The last level cache 104 is configured to send multiple write transactions to the main memory 108 for each bulk store operation to perform a bulk initialization of the main memory 108 for each bulk store operation. The last level cache 104 is configured to track status of the bulk store operations received from the load store unit 112. Further details of one embodiment of the last level cache are depicted in FIG. 1B.

Note that the main memory 108 could be shared between the processor core 102 depicted in FIG. 1A and other processors (not depicted in FIG. 1A). It is possible that such other processors could attempt to access a region of main memory 108 during bulk initialization of that region. In other words, such accesses could leave the region in a state such that it is not certain that the region still contains the values to which it was initialized. Herein, the region being intact means that the region still contains the values to which it was initialized. The last level cache 104 is configured to track such possible accesses and, if necessary, change the status from intact to not intact. Such status may be reported to the load store unit 112.

Figure 1B:
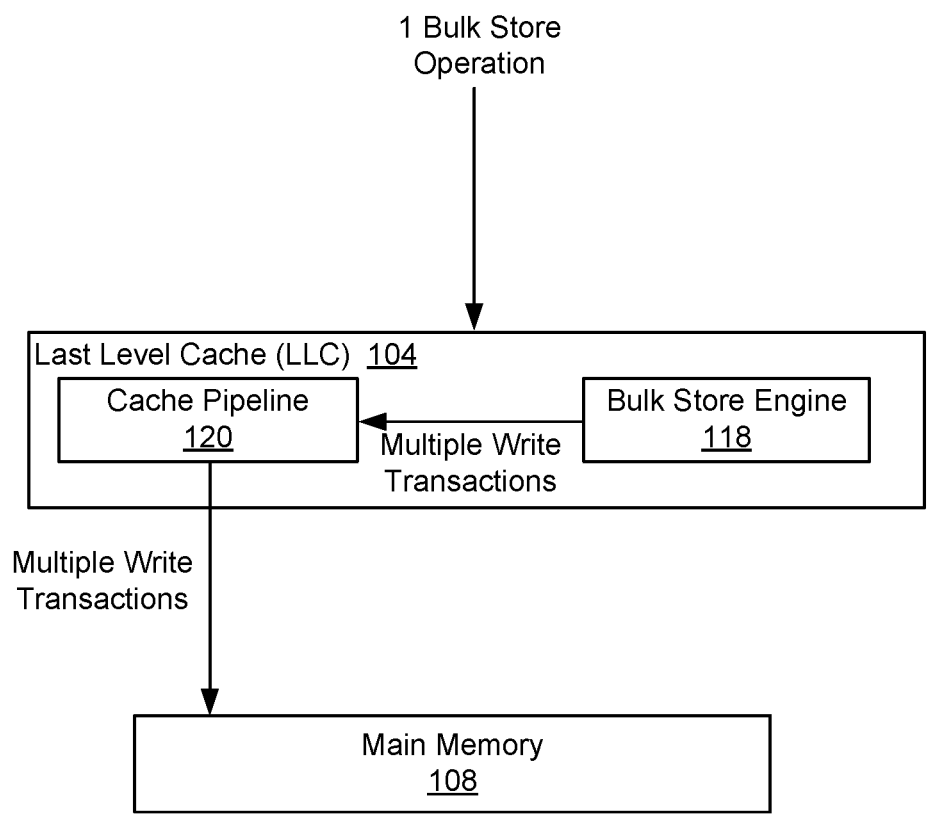
FIG. 1B is a block diagram of one embodiment of a last level cache that forms multiple write transactions from one bulk store operation.

FIG. 1B depicts of one embodiment of a last level cache 104 that forms multiple write transactions from one bulk store operation. The last level cache 104 has a bulk store engine 118 and a cache pipeline 120. The bulk store engine 118 and cache pipeline 120 may be implemented in hardware. In one embodiment, bulk store engine 118 comprises combinational logic and sequential logic. In one embodiment, the cache pipeline 120 comprises combinational logic and sequential logic. In one embodiment, to initiate a bulk initialization of main memory 108, the load store unit 112 in the processor core 102 sends a bulk store operation to the last level cache 104. In one embodiment, the bulk store engine 118 generates multiple write transactions for the bulk store operation, and sends the multiple write transactions to the cache pipeline 120. The cache pipeline 120 processes each write transaction. In one embodiment, the cache pipeline maintains cache coherency in the caches in the computer system 100, while the bulk store operation is being processed. The write transactions may be cache line sized transactions.

Figures 2, 3:
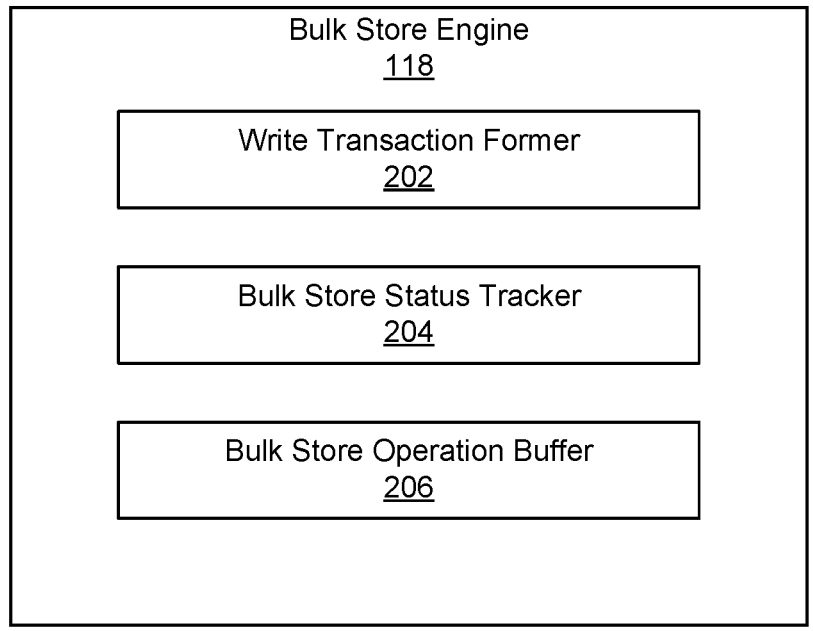
FIG. 2 depicts one embodiment of the bulk store engine in FIG. 1B.
FIG. 3 depicts one embodiment of bulk store operation buffer, which may reside in the bulk store engine.

FIG. 2 depicts one embodiment of the bulk store engine 118 depicted in FIG. 1B. The bulk store engine 118 is configured to perform a bulk initialization of a region in main memory 108 for each bulk store operation. The bulk store engine 118 has write transaction former 202 that is configured to form multiple write transactions for each bulk store operation. In one embodiment, each write transaction is for a cache line sized region in main memory 108. In one embodiment, the write transaction former 202 sends the write transactions cache pipeline 120, which sends a corresponding number of write transactions to the main memory 108.

The bulk store engine 118 has a bulk store status tracker 204 that is configured to track the status of each bulk store operation. The bulk store status tracker 204 keeps track of the status in a bulk store operation buffer 206. The write transaction former 202 and the bulk store status tracker 204 may be part of a cache controller in the last level cache 104. In one embodiment, the write transaction former 202 is implemented in hardware. For example, the write transaction former 202 may be implemented with sequential and/or combinational logic. In one embodiment, bulk store status tracker 204 is implemented in hardware. For example, the bulk store status tracker 204 may be implemented with sequential and/or combinational logic. For purpose of discussion, the bulk store operation buffer 206 is depicted in the bulk store engine 118. The bulk store operation buffer 206 may be implemented in a portion of the memory that is used for cache entries in the last level cache 104. Further details of one embodiment of bulk store operation buffer 206 are shown in FIG. 3.

FIG. 3 depicts one embodiment of the bulk store operation buffer 206. When the bulk store engine 118 receives a bulk store operation, the bulk store engine 118 creates a new entry in the bulk store operation buffer 206. Each bulk store operation includes a physical address (PA) 304, which is the starting physical address in memory (e.g., main memory 108) to be initialized. In FIG. 3, there are entries for two bulk store operations. One of the entries has a physical address of 0x8000 (in hexadecimal or HEX). The other entry has a physical address of 0x9000. The size of the region in memory to be initialized may be a default value. Hence, the size need not be specified in the bulk store operation. Optionally, the size of the region may be specified in the bulk store operation. For the sake of illustration, an example will be discussed in which the size is 4 kilobytes (or 1000 HEX). Hence, one of the bulk store operations may be used to initialize physical addresses between 0x8000 and 0x8FFF (inclusive). The other bulk store operation may be used to initialize physical addresses between 0x9000 and 0x9FFF (inclusive).

As each bulk store operation is being processed, the bulk store engine 118 tracks status of the bulk store operation. The column labeled "Progress" 306 is used to track how far along the bulk store operation has proceeded. As noted above, the bulk store engine 118 forms multiple write transactions for each bulk store operation. The progress column 306 is used to track how many of the write transactions have been completed. In FIG. 3, one of the bulk store operations is done, and the other has 53 write transactions completed. There may be, for example, 64 write transactions to main memory 108 for a bulk store operation.

As each bulk store operation is being processed, the bulk store engine 118 also monitors whether the region in main memory 108 associated with a bulk store transaction is affected by any other stores to main memory 108. For example, during the bulk initialization of a region in main memory 108, a portion of that region could be written to. This write might come from a processor core other than the processor core that initiated the bulk store operation. The column labeled "Intact" (with each entry being referred to as intact flag 308) is used to track whether the region is intact.

The column labeled "Valid" (with each entry being referred to as an LLC valid flag 302) is used to track whether the entry is still valid. In one embodiment, the entry for a bulk store operation is invalidated if the intact flag 308 is set to zero. Otherwise, the entry may remain in the bulk store operation buffer 206 after the bulk store operation is complete.

Figure 4:
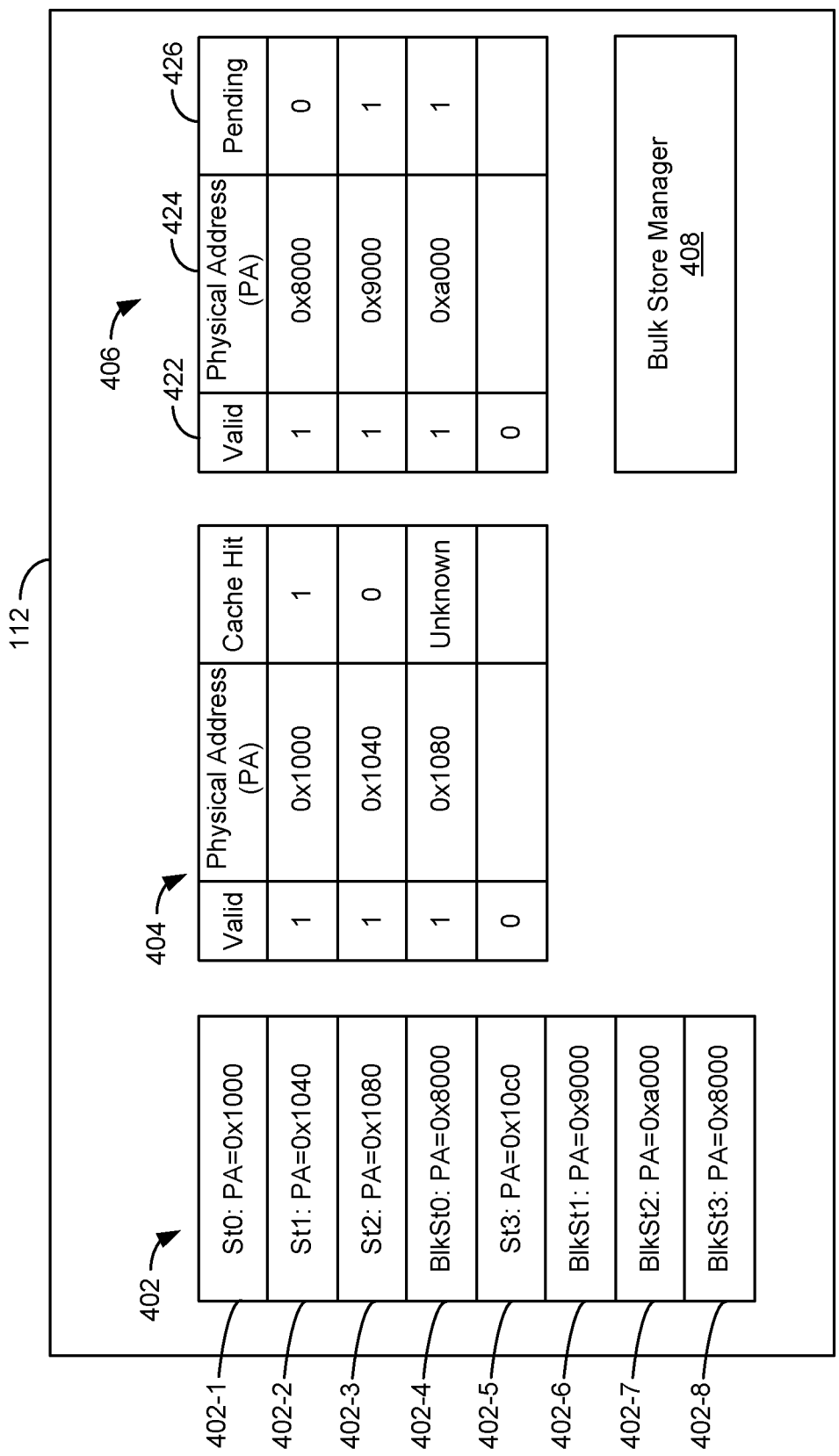
FIG. 4 depicts one embodiment of a load store unit.

FIG. 4 depicts one embodiment of a load store unit 112. The load store unit 112 has a store queue 402, a store combine buffer 404, and a bulk store combine buffer 406. The store queue 402, store combine buffer 404, and bulk store combine buffer 406 may be implemented in memory in the processor core 102. The bulk store manager 408 is configured to maintain the bulk store combine buffer 406. The bulk store manager 408 may be implemented in hardware.

A number of entries 402-1 to 402-8 are depicted on the store queue 402. The entries may be executed in an order from entry 402-1 to entry 402-8. The entries correspond to the instructions in Table I. However, since instruction I4 is a load instruction, it is not represented on the store queue 402. In the store instructions in Table I, the physical address in main memory at which to store some value may be derived from register R1. In some cases, register R1 contains a virtual address, which is converted into a physical address in main memory 108.

TABLE I

| | |
|---|---|
| I0: | STR [R1], R8 |
| I1: | STR [R1 + 0x40], R9 |
| I2: | STR [R1 + 0x80], R9 |
| I3: | DC ZVA PG [R1] |
| I4: | LDR R3, [R1 + 0x40] |
| I5: | STR [R1 + 0xc0], R9 |
| I6: | DC ZVA PG [R1 + 0x1000] |
| I7: | DC ZVA PG [R1 + 0x2000] |
| I8: | DC ZVA PG [R1] |

Entry 402-1 holds an operation (St0) corresponding to instruction I0 in Table I. Entry 402-1 is thus an operation to store the contents of register R8 to physical address 0x1000 in main memory 108. Entry 402-2 holds an operation (St1) corresponding to instruction I1 in Table I. Entry 402-2 is thus an operation to store the contents of register R9 to physical address 0x1040 in main memory 108. Entry 402-3 holds an operation (St2) corresponding to instruction I2 in Table I. Entry 402-3 is thus an operation to store the contents of register R9 to physical address 0x1080 in main memory 108. These three store operations (St0, St1, St2) may be conventional store operations, which may each store to a region of memory equal to 64 bytes. The region may be larger or smaller (e.g., 32 bytes or 128 bytes). In one embodiment, 64 bytes is the size of a cache line. The cache line may be larger or smaller (e.g., 32 bytes or 128 bytes).

Entry 402-4 corresponds to instruction I3 in Table I and holds a bulk store operation (BlkSt0). The bulk store operation has a physical address of 0x8000. In one embodiment, the bulk store operation is used to initialize a region of 0x1000 in main memory 108. In one embodiment, the bulk store operation is used to initialize a region the size of a page in main memory 108. The page may be, for example, 4 kilobytes (or 1000 HEX) in size. Note that in Table I, instruction I3 specifies register R1, which indicates that the physical address may be obtained based on the contents of register R1. In some embodiments, register R1 contains a virtual address, which is translated to a physical address in main memory 108. Instruction I3 does not contain an operand for the data to be stored at the physical address, as the data may be implied by the DC ZVA PG instruction. In one embodiment, the DC ZVA PG instruction implies that the contents of memory are to be zeroed out. However, the DC ZVA PG instruction could be used to imply some other pattern, such as initializing the memory to all ones. Optionally, an operand could be provided in the DC ZVA PG instruction to, for example, provide a pattern to be written to memory. For example, a second register could be specified in the DC ZVA PG instruction, wherein the contents of the second register contain a pattern to be written to memory. Note that this pattern may be repeated many times, as the size of the region to be initialized in memory is typically much larger than the register.

There is not an entry on the store queue 402 for instruction I4, as instruction I4 is a load instruction, as opposed to a store instruction. However, there may be a load queue (not depicted in FIG. 4) in the load store unit 112 on which a load operation for instruction I4 may be placed. In one embodiment, the bulk store manager 408 blocks younger loads to regions of memory that are being initialized by bulk store operations. Hence, it is possible that the bulk store manager 408 could block instruction I4 from executing due a pending bulk store operation to the region of memory from which instruction I4 is to load.

Entry 402-5 holds an operation (St3) corresponding to I5 in Table I. Thus, entry 402-5 is an operation to store the contents of register R9 at a physical address 0x10c0 in main memory 108. Entry 402-6 holds a bulk store operation (BlkSt1) corresponding to instruction I6 in Table 1. The bulk store operation St1 has a physical address of 0x9000, which is determined based on adding 0x1000 to the contents of register R1 (see Table 1). As noted above, the contents of register R1 could be a virtual address, which is translated to a physical address. Entry 402-7 holds a bulk store operation (BlkSt2) corresponding to instruction I7 in Table 1. The bulk store operation St2 has a physical address of 0xa000, which is determined based on adding 0x2000 to the contents of register R1 (see Table 1). Entry 402-8 holds a bulk store operation (BlkSt3) corresponding to instruction I8 in Table 1. The bulk store operation St3 has a physical address of 0x8000, which is determined based on the contents of register R1 (see Table 1).

The store combine buffer 404 is used to track store operations. As indicated by the physical addresses, entries for the first three conventional store operations (St0, St1, St2) are represented in the store combine buffer 404. The store combine buffer 404 has a column that indicates whether the respective store operation resulted in a cache hit. The store combine buffer 404 has a column that indicates whether the entry is currently valid.

The bulk store combine buffer 406 is used to track bulk store operations. As indicated by the physical addresses in the physical address column 424, entries for the first three bulk store operations (BlkSt0, BlkSt1, BlkSt2) are represented in the bulk store combine buffer 406. The bulk store combine buffer 406 has a column that indicates whether the respective bulk store operation is pending (referred to a pending flag 426). The bulk store combine buffer 406 has a column that indicates whether the entry is currently valid (referred to a LSU valid flag 422).

The bulk store manager 408 is configured to maintain the bulk store combine buffer 406. The bulk store manager 408 may add entries to the bulk store combine buffer 406 when a bulk store operation is initiated. The bulk store manager 408 may update the status (e.g., pending, valid) in response to status reports from the bulk store engine 118 in the LLC 104. Further details of one embodiment of maintaining the bulk store combine buffer 406 are described in connection with FIG. 12 to be discussed below. In one embodiment, the bulk store manager 408 blocks younger loads to any region of main memory 108 for which a bulk store operation is pending. Further details of one embodiment of blocking younger loads are described in connection with FIG. 12 to be discussed below. The bulk store manager 408 may be implemented in hardware. In one embodiment, the bulk store manager 408 comprises combinational logic and sequential logic.

Figure 5:
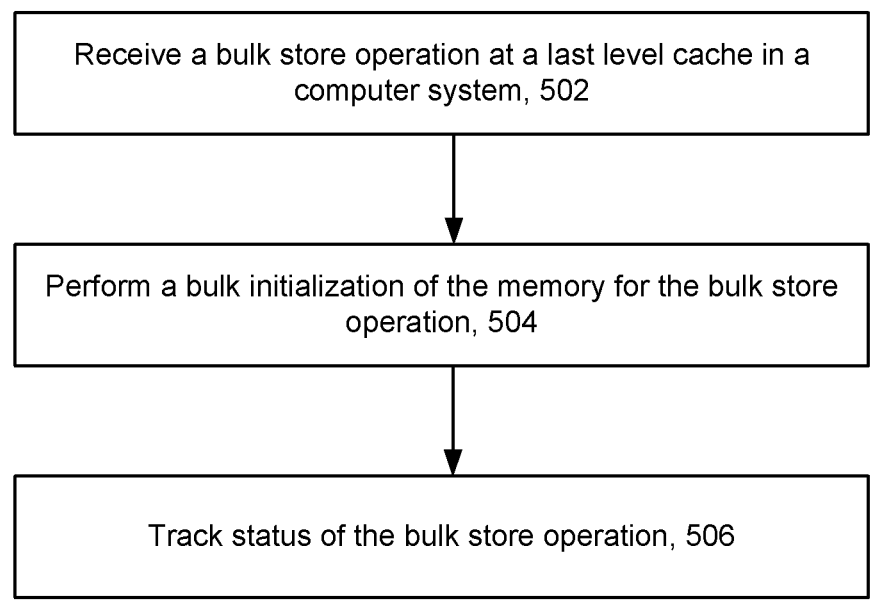
FIG. 5 depicts a flowchart of one embodiment of a process of performing a bulk initialization of memory.

FIG. 5 depicts a flowchart of one embodiment of a process 500 of performing a bulk initialization of memory. The process 500 may be used in computer system 100 to initialize main memory 108. In one embodiment, process 500 is performed by bulk store engine 118 in LLC 104. Reference will be made to elements in FIG. 1A when discussing process 500; however, process 500 is not limited to FIG. 1A. Steps 504-506 in process 500 are described in a certain order as a matter of convenience of explanation and do not necessarily occur in the depicted order. Thus, steps 504-506 could occur in a different order. Also, steps 504-506 may be performed concurrently.

Step 502 includes receiving a bulk store operation at a last level cache (LLC) 104 in a computer system 100. In one embodiment, the processor core 102 sends the bulk store operation to the LLC 104. In one embodiment, the load store unit 112 sends the bulk store operation to the LLC 104. The bulk store operation may bypass the other caches, such as internal cache 114 (e.g., L1 cache and L2 cache). Therefore, the other caches may be offloaded during the bulk store operation.

Step 504 includes performing a bulk initialization of memory for the bulk store operation. In one embodiment, bulk initialization of main memory 108 is performed. In one embodiment, the bulk initialization results in a zeroing out of a region of the memory. In other words, the contents of the region of memory may be all zeros after the bulk initialization. However, a different pattern could result from the bulk initialization. For example, the contents of the region of memory may be all ones after the bulk initialization. A different pattern could result such as alternating ones and zeroes. Further details of one embodiment of performing a bulk initialization of memory are shown and described with respect to FIG. 9.

Step 506 includes tracking status of the bulk store operation. In one embodiment, the bulk store engine 118 updates the bulk store operation buffer 206. For example, the bulk store engine 118 may update the progress column, the intact column, and the valid column. Further details of one embodiment of tracking status of a bulk initialization operation are shown and described with respect to FIG. 8.

Figure 6:
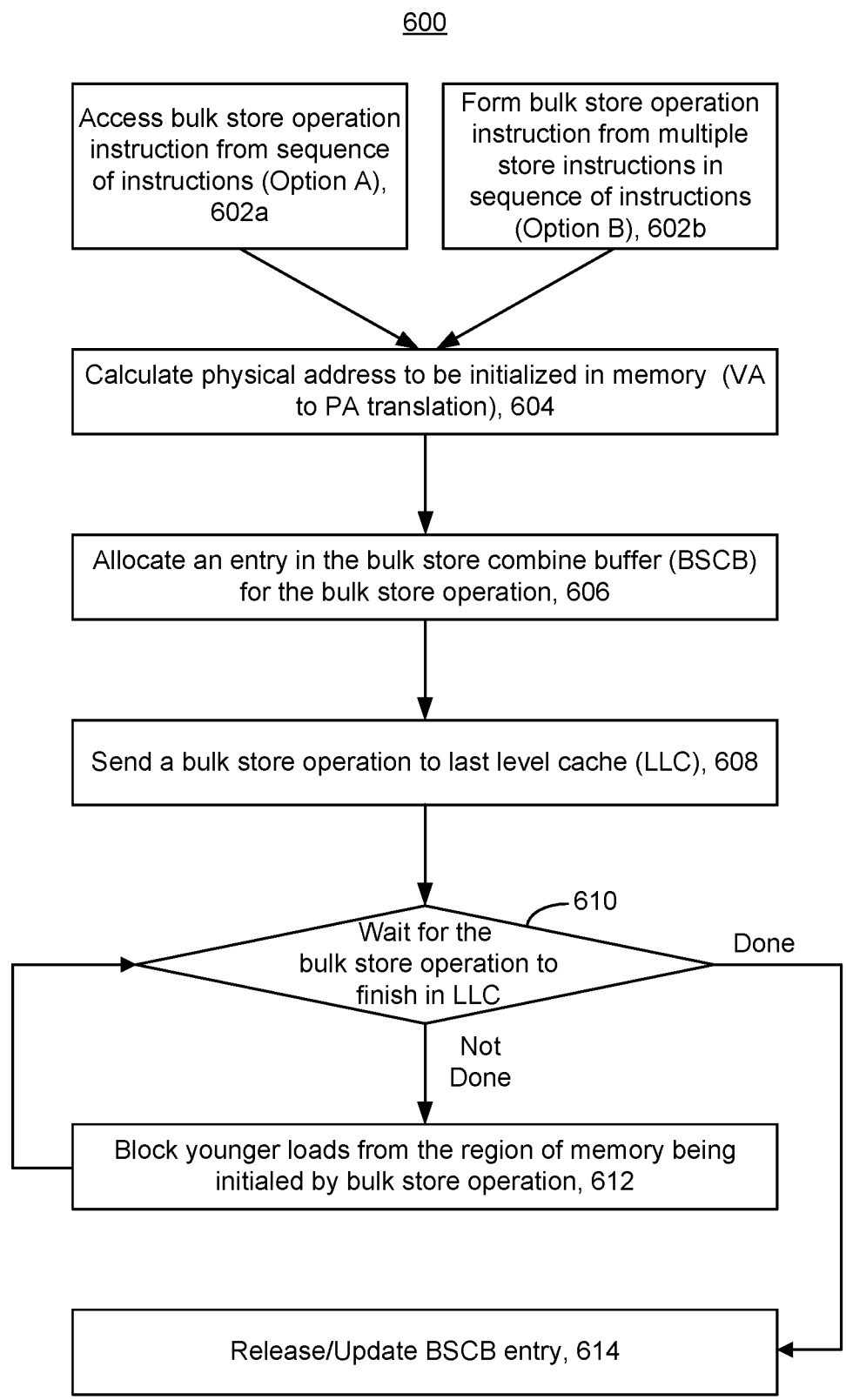
FIG. 6 depicts a flowchart of one embodiment of a process performed at load store unit with respect to a bulk store operation.

FIG. 6 depicts a flowchart of one embodiment of a process 600 performed at load store unit 112 with respect to a bulk store operation. The process 600 may be initiated when instructions being executed in the processor core 102 indicate that a bulk store operation is to be performed.

Process 600 describes two ways in which a bulk store operation may be initiated. Step 602a describes Option A in which the bulk store operation is obtained from a bulk store instruction in a set of instructions executed in the processor core 102. Table I shows a set of instructions that contain four bulk store instructions (Instructions I3, I6, I7, and I8).

Step 602b describes Option B in which the bulk store operation is formed based on a number of store instructions. Each of these store instructions are to store the same values to memory. For example, each of the store instructions may be to zero out memory. However, each of these store instructions may be to store to a different region in memory. Collectively, the store instructions may be configured to store to a contiguous region of the memory. Table II depicts example store instructions from which a bulk store operation may be formed. Forming a single bulk store operation from multiple store instructions may be referred to as code morphing. In one embodiment, the bulk store manager 408 is able to perform the code morphing. For convenience of explanation the instructions are numbered from I0 to I63 in Table II, but these are not the same instructions as in Table I.

TABLE II

| | |
|---|---|
| I0: | STR [R1], R8 |
| I1: | STR [R1 + 0x040], R8 |
| I2: | STR [R1 + 0x080], R8 |
| . | |
| . | |
| . | |
| I63: | STR [R1 + 0xFC0], R8 |

In Table II, each store instruction is associated with a region of memory having a size of 40 HEX (or 64 bytes). In Table II, each of the store instructions specifies the address based on the contents of register R1. In one embodiment, register R1 contains a virtual address that is translated to a physical address in main memory 108. The 64 store instructions are thus to write to a contiguous region of memory totaling four kilobytes. Note that the size of the region to which each instruction writes, the total size of the region that all instructions write, and the number of instructions are all for the purpose of example. However, the store instructions from which the bulk store operation is formed should write to a contiguous region of memory.

In Table II, each of the store instructions specifies the data based on the contents of register R8. This is for the purpose of illustration. In one embodiment, the data should be the same for all of the store instructions. In one embodiment, the data is not expressly provided, but is implied. For example, the second register (R8 in Table II) need not be provided in one embodiment, wherein the data is implied. The implied data could be to zero out the memory.

Step 604 includes calculating a physical address to be initialized in memory. Step 604 may include a virtual address to physical address translation. In one embodiment, the addresses contained in the register(s) referenced in the instructions from which bulk store operations are formed are virtual addresses. For example, the address in register R1 in the instructions in Table I may be a virtual address. Likewise, the address in register R1 in the instructions in Table II may be a virtual address.

Step 606 includes allocating an entry in the bulk store combine buffer 406 for the bulk store operation.

Step 608 includes the load store unit 112 sending a bulk store operation to the last level cache 104. The bulk store operation includes the physical address in main memory 108 that is to be initialized. The bulk store operation also includes an operand or other identifier that indicates that this is a bulk store operation. In one embodiment, the load store unit 112 sends the bulk store operation directly to the last level cache 104, bypassing all other caches in a cache hierarchy (such as internal cache 114). This has the benefit of offloading the other caches from processing the bulk store operation.

Step 610 includes the load store unit 112 waiting for the bulk store operation to complete. By waiting for the bulk store operation it is meant that the load store unit 112 does not take action to initialize the main memory 108, as that is left to the last level cache 104.

Step 612 is performed while waiting for the bulk store operation to complete. Step 612 includes blocking younger loads to the region of main memory 108 being initialized by the bulk store operation. A younger load means a load that, in strict accordance with the order of instructions, is to occur after the bulk store operation. Note that sometimes instructions to load from memory or store to memory may be executed out of order. With respect to Table I, instruction I4 is a younger load relative to instruction I3. Thus, if the bulk store operation originated from instruction I3, the load associated with instruction I4 would be blocked until the bulk store operation completes, under the assumption that the load is from a region of main memory 108 being initialized by the bulk store operation. However, instruction I4 is not a younger load with respect to instructions I6, I7 or I8. Thus, if the bulk store operation originated from any of instructions I6, I7 or I8, the load associated with instruction I4 would not be blocked. Further details of one embodiment of blocking younger loads are described below in connection with FIG. 12.

After the bulk store operation is finished, step 614 is performed. In one embodiment, the last level cache 104 informs the load store unit 112 when the bulk store operation is finished. Step 614 includes releasing/updating the entry for the bulk store operation in the bulk store combine buffer 406. Releasing the entry means to remove or otherwise mark the entry so that it is no longer used. In one embodiment, the entry is marked invalid to release it. In one embodiment, the entry is physically deleted to release it. Updating the entry means that the entry is changed in some manner and that the information in the entry may still be used. In one embodiment, the pending status is changed from pending to not pending, and the LSU valid flag 422 is kept at valid when updating the entry. A status of not pending may also be referred to as complete. Further details of one embodiment of releasing/updating the entry for the bulk store operation are described below in connection with FIG. 11.

Figure 7:
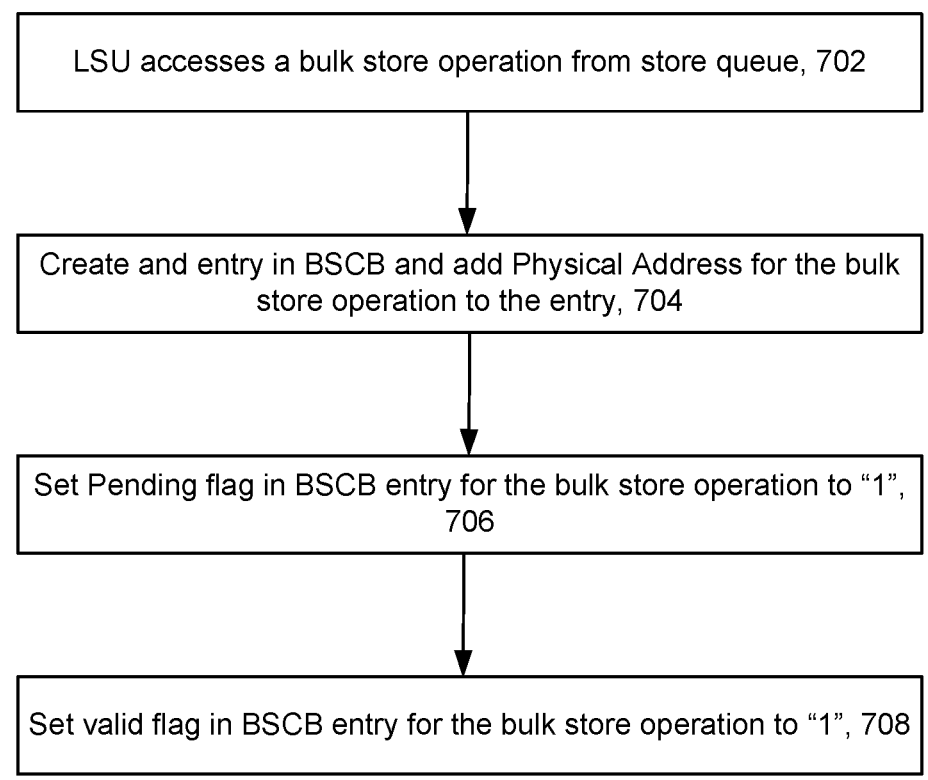
FIG. 7 depicts a flowchart of one embodiment of a process of actions at the load store unit when a bulk store operation is initiated.

FIG. 7 depicts a flowchart of one embodiment of a process 700 of actions at the load store unit 112 when a bulk store operation is initiated. Process 700 may be performed after a bulk store operation has been added to the store queue 402. Process 700 describes further details of one embodiment of step 606 in FIG. 6.

Step 702 includes the load store unit 112 accessing a bulk store operation from the store queue 402. For the sake of illustration, the bulk store operation at entry 402-6 will be discussed in process 700.

Step 704 includes creating an entry for the bulk store operation to the bulk store combine buffer 406. Step 704 also includes adding the physical address for the bulk store operation to the entry. Step 706 includes setting the pending flag 426 in the entry to "1". Step 708 includes setting the LSU valid flag 422 in the entry to "1". With reference to FIG. 4, the entry having physical address 0x9000 as added. The pending flag 426 for the entry is set to "1". The LSU valid flag 422 for the entry is set to "1".

Figure 8:
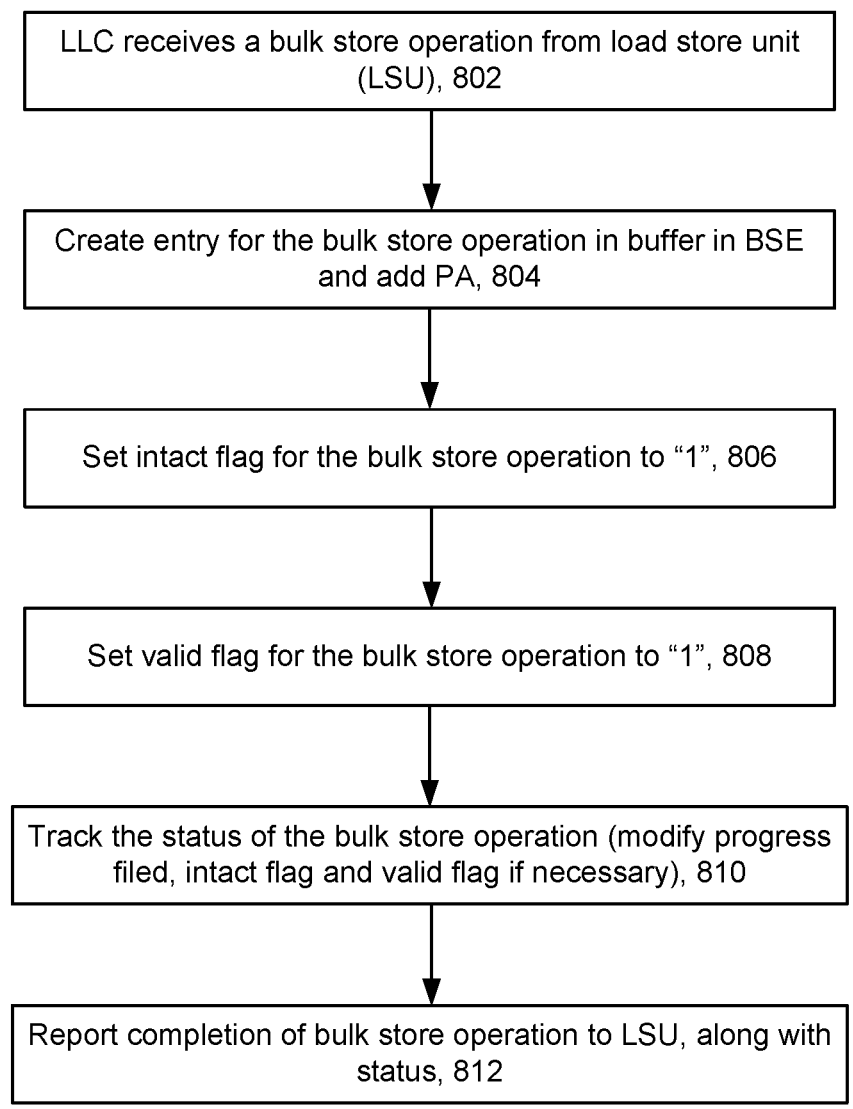
FIG. 8 depicts one embodiment of a process of actions at the last level cache to track the status of a bulk store operation.

FIG. 8 depicts one embodiment of a process 800 of actions at the last level cache 104 to track the status of a bulk store operation. Process 800 provides further details of one embodiment of step 506 in FIG. 5. In one embodiment, process 800 is performed by bulk store status tracker 204.

Step 802 includes the last level cache 104 receiving a bulk store operation from the load store unit 112. In one embodiment, step 802 occurs as a result of step 608 in FIG. 6. The bulk store operation contains an operand (or other type of identifier) that indicates that this is a bulk store operation. In an embodiment, the last level cache 104 identifies this as a bulk store operation based on the operand. In an embodiment, the bulk store operation also contains a physical address in main memory 108 that is to be initialized.

Step 804 includes the bulk store engine 118 in the last level cache 104 creating an entry for the bulk store operation in the bulk store operation buffer 206. Step 804 also includes adding the physical address in the bulk store operation to the buffer entry.

Step 806 includes setting the intact flag 308 in the entry to "1". Step 808 includes setting the LLC valid flag 302 in the entry to "1". With reference to FIG. 4, the entry having physical address 0x9000 as added, as one example. The pending flag for the entry is set to "1". The LLC valid flag 302 for the entry is set to "1". The progress field is initially set to 0 to indicate that the process of sending write transactions to the main memory 108 has not yet started.

Step 810 includes tracking the status of the bulk store operation. Step 810 includes modifying the progress field as more of the memory is initialized for this bulk store operation. Further details of updating the progress field are described in connection with FIG. 9. Step 810 may include modifying the intact flag 308 for the entry. Step 810 may include modifying the LLC valid flag 302 for the entry.

Step 812 includes the last level cache 104 reporting the completion of the bulk store operation to the load store unit 112. Step 812 also includes the last level cache 104 reporting the status of the bulk store operation to the load store unit 112. In one embodiment, the status includes the intact status.

Figure 9:
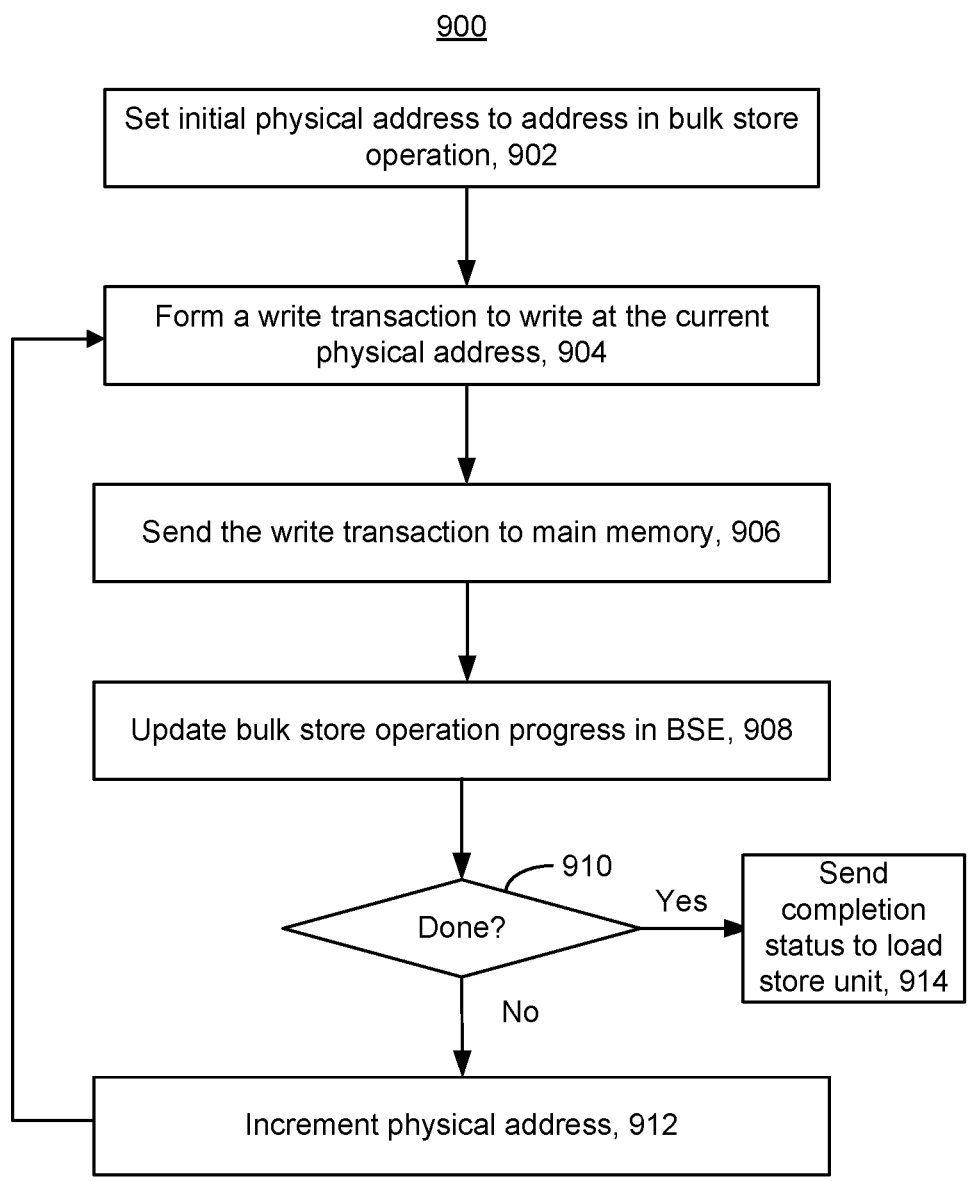
FIG. 9 depicts a flowchart of one embodiment of a process of actions at the last level cache to initialize the memory for a bulk store operation.

FIG. 9 depicts a flowchart of one embodiment of a process 900 of actions at the last level cache 104 to initialize the memory for a bulk store operation. Process 900 provides further details of one embodiment of step 504 in FIG. 5.

Step 902 includes setting an initial physical address to the address in the bulk store operation. This is a physical address in main memory 108, in one embodiment.

Step 904 includes forming a write transaction to write at the current physical address. In one embodiment, the write transaction is a write transaction that writes one cache line. In one embodiment, the write transaction is a WriteUnique transaction. In one embodiment, the WriteUnique transaction is compliant with the AMBA® 5 CHI Architecture Specification, which is published by ARM Ltd. As known to those of ordinary skill in the art, there are a variety of types of WriteUnique transactions (e.g., WriteUniquePtl, WriteUniqueFull, WriteUniquePtlStash, WriteUniqueFullStash).

Step 906 includes sending the write transaction to the main memory 108. Step 906 may also include receiving a response from the main memory reporting the status of the write transaction. For the sake of discussion, it is assumed in process 900 that all write transactions complete successfully. However, if there is an error with one or more write transactions, then the process 900 could end with an error status.

In one embodiment, step 906 includes sending the WriteUnique transaction that was formed in step 904 to the cache pipeline 120. The WriteUnique transaction may be used to remove all copies of a cache line before issuing a write transaction to main memory 108. The WriteUnique transaction could result in a back snoop to the processor core 102. The WriteUnique transaction could result in snoops of other processor cores, as well. After the snoops are done, the data is written to the main memory 108.

Step 908 includes updating the progress of the bulk store operation in the buffer 206 in the bulk store engine 118. In one embodiment, the progress field serves as a counter of the number of write transaction that have successfully completed. Thus, the progress field may be incremented by one each time a write transaction successfully completes.

Step 910 is a determination of whether the bulk store operation is done. In other words, the bulk store engine 118 determines whether all of the write transactions have successfully completed. If not, then control passes to step 912, wherein the physical address is incremented. The size of the increment is equal to the size of each write transaction, in one embodiment. The size of the increment is equal to the size of a cache line, in one embodiment.

After step 912, control passes to step 904. In step 904 another write transaction is formed using the current value of the physical address. When all write transactions successfully complete (step 910 is yes), control passes to step 914. Step 914 includes the last level cache 104 sending a completion status for the bulk store operation to the load store unit 112. In one embodiment, the completion status includes an indication of whether the bulk store operation was successful at initializing memory. In one embodiment, the completion status includes the intact status for the bulk store operation entry in buffer 206.

Figure 10:
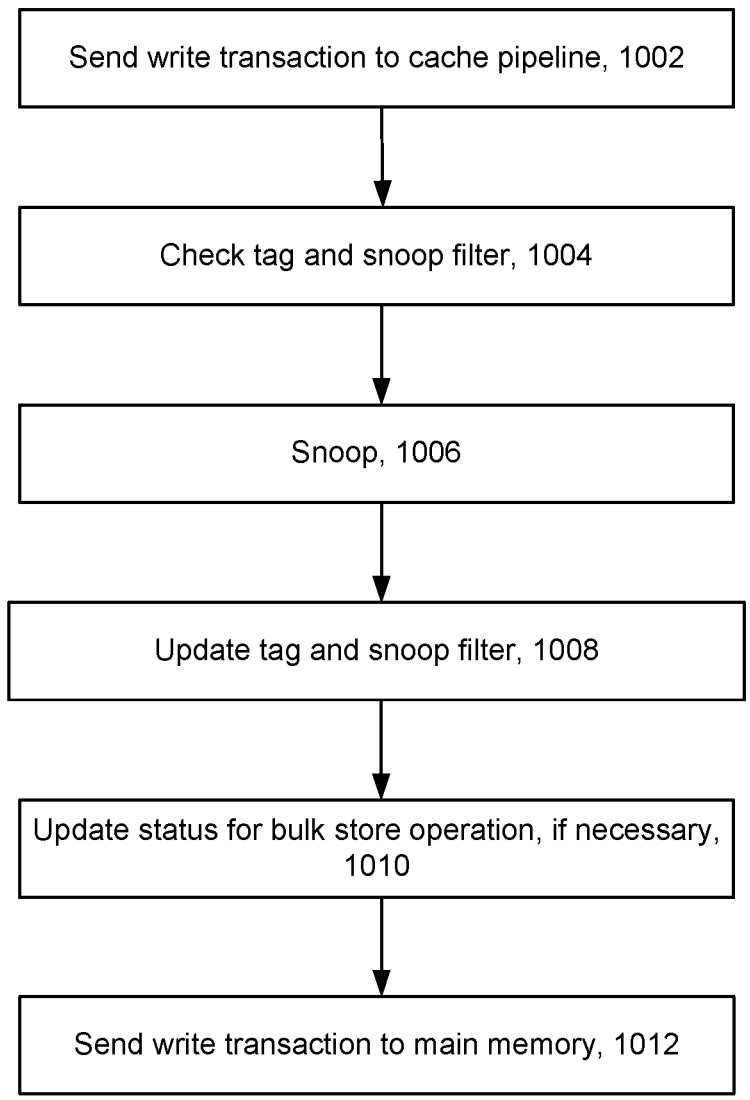
FIG. 10 depicts a flowchart of one embodiment of a process of actions at the last level cache to maintain cache coherence while processing a bulk store operation.

FIG. 10 depicts a flowchart of one embodiment of a process 1000 of actions at the last level cache 104 to maintain cache coherence while processing a bulk store operation. In one embodiment, process 1000 is performed for each of the write transactions in step 906 of process 900. Thus, process 1000 provides further details for one embodiment of step 906. In one embodiment, process 1000 is performed by the cache pipeline 120 in the last level cache 104. Process 1000 may be performed for each write transaction (e.g., each WriteUnique transaction) sent to the cache pipeline 120.

Step 1002 includes the bulk store engine 118 sending a write transaction to the cache pipeline 120. As noted above, this may be a WriteUnique transaction. In one embodiment, the write transaction is to write to a region of memory having the size of a cache line.

Step 1004 includes the last level cache 104 checking the tag and the snoop filter. The tag may be used to determine whether the last level cache 104 has a cache line associated with the address in main memory to be initialized by the write transaction. The snoop filter may be examined to determine whether another cache has a cache line associated with the address in main memory to be initialized by the write transaction. The snoop filter thus keeps track of coherency states of cache lines.

Step 1006 includes the last level caching 104 snooping. Step 1006 may result in a back snoop to the processor core 102 that initiated the bulk store operation. Step 1006 may result in a snoop of other processor cores that share the main memory 108.

Step 1008 includes the last level cache 104 updating the tag and the snoop filter. Hence, the last level cache is able to maintain cache coherence while processing the bulk store operation.

Step 1010 includes updating the status for the bulk store operation, if necessary. Note that during process 1000, other processor cores could be trying to read or write to a portion of the main memory 108 that is being initialized by the bulk store operation. In one embodiment, if any read request touches the region of main memory 108 being initialized, the intact flag 308 in the bulk store operation buffer 206 is set to 0. In one embodiment, if any snoop request touches the region of main memory 108 being initialized, the intact flag 308 is set to 0.

Step 1012 includes the last level cache sending a write transaction to the main memory 108.

Figure 11:
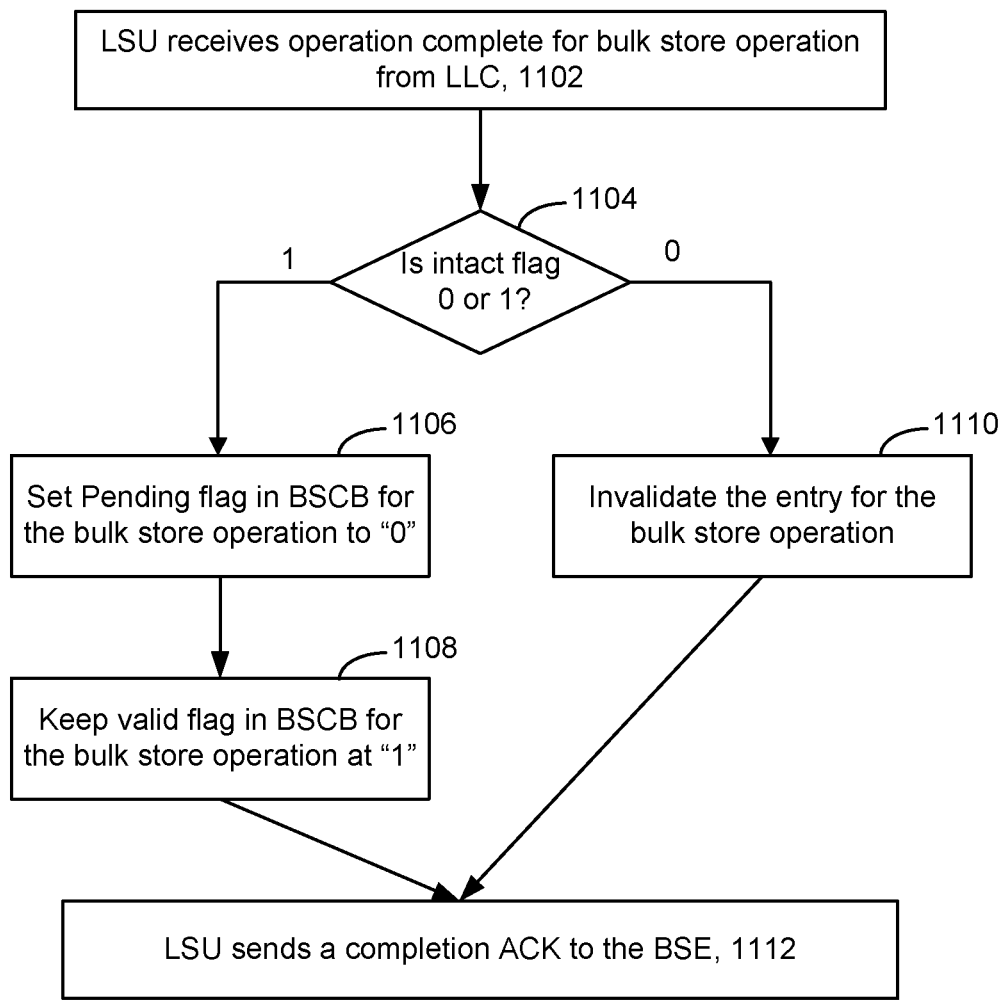
FIG. 11 depicts a flowchart of one embodiment of a process of actions performed at the load store unit when a bulk store operation is completed.

FIG. 11 depicts a flowchart of one embodiment of a process 1100 of actions performed at the load store unit 112 when a bulk store operation is completed.

Step 1102 includes the load store unit 112 receiving an indication from the last level cache 104 that the bulk store operation has completed.

Step 1104 includes the load store unit 112 checking whether an intact flag 308 in the response is set to 1 or 0. The last level cache 104 sets the intact flag 308 to 1 to indicate that the region of memory being initialized is still intact. The last level cache sets the intact flag 308 to 0 to indicate that the region of memory being initialized is no longer intact.

Steps 1106 and 1108 are performed in response to the intact flag 308 being 1. In step 1106, the pending flag 426 in the entry for this bulk store operation in the bulk store combine buffer 406 is set to 0, which indicates that the bulk store operation is no longer pending (otherwise referred to as complete). Step 1108 includes keeping the LSU valid flag 422 in the entry in the bulk store combine buffer 406 at 1. A the LSU valid flag 422 of 1, along with a pending flag 426 of 0, may be interpreted as the region in memory that was initialized still being intact after completion of the bulk store operation.

Step 1110 is performed in response to the intact flag 308 being 0. In step 1110, the entry for this bulk store operation in the bulk store combine buffer 406 invalidated. In one embodiment, this includes setting the LSU valid flag 422 in the entry in the bulk store combine buffer 406 to 0, which indicates that the entry is no longer valid. Other techniques may be used to invalidate the entry.

After either steps 1106 and 1108 or, alternatively, step 1110 is performed, control passes to step 1112. Step 1112 includes the load store unit 112 sending a completion acknowledgment (ACK) to the bulk store engine 118.

Figure 12:
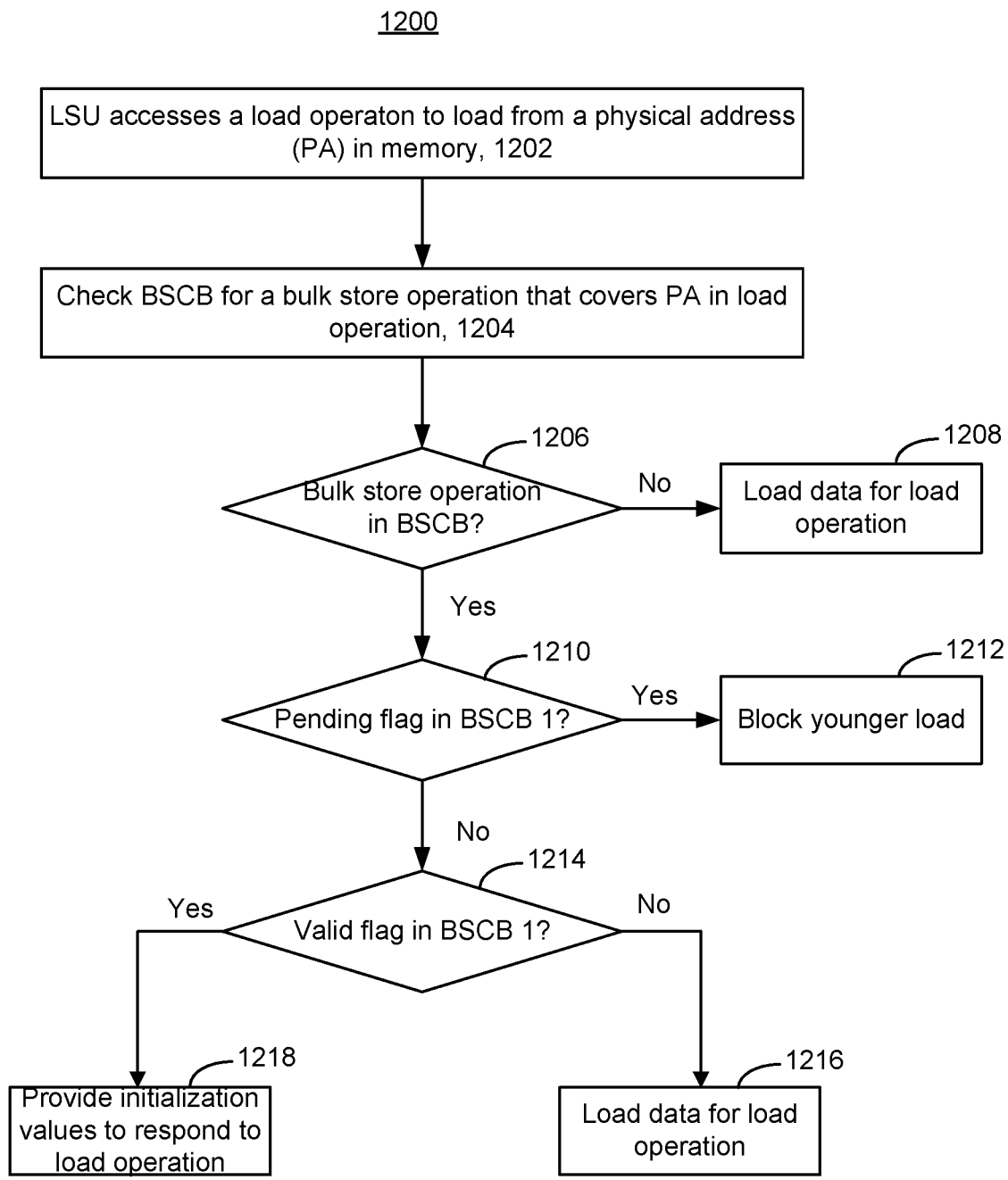
FIG. 12 depicts a flowchart of one embodiment of a process of a load store unit handling loads while, or after, a bulk store operation is pending.

FIG. 12 depicts a flowchart of one embodiment of a process 1200 of a load store unit 112 handling loads while, or after, a bulk store operation is pending.

Step 1202 includes the load store unit 112 accessing a load operation. The load operation may be accessed from a load queue in the load store unit 112. The load operation may be associated with a load instruction, such as instruction I4 in Table I.

Step 1204 includes checking the bulk store combine buffer 406 for a bulk store operation that covers the physical address in the load command. The following examples will be used to illustration. A first example load instruction is to load the data at 0x6040 in main memory 108 to register R3. A second example load instruction is to load the data at 0x8040 in main memory 108 to register R3. A third example load instruction is to load the data at 0x9040 in main memory 108 to register R3.

With reference to the values depicted in the bulk store combine buffer 406 in FIG. 4, there is not a bulk store operation that covers 0x6040 in main memory 108. Therefore, for the first load instruction step 1206 is no. Therefore, control passes to step 1208 to load the data for that first example instruction. Hence, the data at 0x6040 in main memory 108 may be loaded into, for example, register R3.

For the second example load instruction, there is a bulk store operation that covers 0x8040 in main memory 108. Specifically, the bulk store operation with physical address 0x8000 in main memory 108 covers 0x8040 in main memory 108 (due to the 1000 HEX length of the bulk store operation). For the third example load instruction, there is a bulk store operation that covers 0x9040 in main memory 108. Specifically, the bulk store operation with physical address 0x9000 in main memory 108 covers 0x9040 in main memory 108 (due to the 1000 HEX length of the bulk store operation). Hence, for example instructions two and three, control would pass to step 1210.

Step 1210 includes a determination of whether the pending flag 426 for the bulk store operation is set. If so, control passes to step 1212. In FIG. 4, the pending flag 426 is set for bulk store operation with physical address 0x9000 in main memory 108. Hence, the load from 0x9040 in main memory 108 is blocked, in step 1212. In other words, the load store unit 112 does not allow the third example load instruction to load the data at 0x9040 in main memory 108 into register R3. The blocking is enforced until the bulk store operation with physical address 0x9000 in main memory 108 is completed.

In FIG. 4, the pending flag 426 is not set for bulk store operation with physical address 0x8000 in main memory 108. The pending flag 426 not being set indicates that the bulk store operation is complete. Hence, the load from 0x8040 in main memory 108 is not blocked. Thus, for the second example load instruction, control passes to step 1214. Step 1214 includes a determination of whether the LSU valid flag 422 is sent for the relevant entry in the bulk store combine buffer 406. If the LSU valid flag 422 is not set (step 1214 is no), then the data is loaded from the relevant address in main memory 108, in step 1216. If the LSU valid flag 422 is set (step 1214 is yes), then the data need not be loaded from the relevant address in main memory 108. Instead, since the initialization values are known, the known initialization values can be provided in step 1218. For example, if it is known that the memory is initialized to all zeroes, then all zeroes are provided to respond to the load operation, without the need to access main memory 108. Hence, time can be saved by avoiding a memory access. Also, it is not necessary to store the initialization values in, for example, 64 cache lines. In one embodiment, one entry in the bulk store combine buffer 406 contains information to respond to load requests in step 1218. In step 1218, the information in the entry in the bulk store combine buffer 406 may be used to respond to load instructions that request data for any portion of a large (e.g., page sized) region in memory that was initialized by a completed bulk store operation. Hence, cache space may be saved by not storing initialization values in, for example, 64 cache lines.

In one embodiment, the load store unit means for tracking status of page store operations comprises bulk store manager. In one embodiment, the load store unit means for tracking status of page store operations is configured to perform process 700. In one embodiment, the load store unit means for tracking status of page store operations is configured to perform process 1100.

In one embodiment, means for sending multiple write transactions to the main memory for each page store operation to initialize a page of the main memory comprises one or more of bulk store engine and cache pipeline. In one embodiment, the means for sending multiple write transactions to the main memory for each page store operation to initialize a page of the main memory is configured to perform process 900.

In one embodiment, means for tracking status of the page store operations and reporting the status to the load store unit comprises one or more of bulk store engine and cache pipeline. In one embodiment, the means for tracking status of the page store operations and reporting the status to the load store unit is configured to perform process 1000.

In one embodiment, means for maintaining cache coherence in the hierarchy of caches when initializing the page of the main memory for each page store operation comprises one or more of bulk store engine and cache pipeline. In one embodiment, the means for maintaining cache coherence in the hierarchy of caches when initializing the page of the main memory for each page store operation is configured to perform process 1000.

In one embodiment, the means for tracking page store operations that are pending, wherein each page store operation is associated with a region of the memory to be initialized comprises bulk store manager. In one embodiment, the means for tracking page store operations that are pending, wherein each page store operation is associated with a region of the memory to be initialized is configured to perform process 700. In one embodiment, the means for tracking page store operations that are pending, wherein each page store operation is associated with a region of the memory to be initialized is configured to perform process 1100.

In one embodiment, the means for blocking younger loads associated with any region of the memory associated with any pending page store operation comprises bulk store manager. In one embodiment, the means for blocking younger loads associated with any region of the memory associated with any pending page store operation is configured to perform process 1200.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system for initializing a memory, the computer system comprising:
   a processor core comprising a central processing unit (CPU), a load store unit, and an internal cache; and
   a last level cache in communication with the processor core, the last level cache comprising a cache pipeline, the last level cache configured to:
   receive bulk store operations from the load store unit, each bulk store operation including a physical address in the memory to be initialized;
   send multiple first write transactions to the cache pipeline for each bulk store operation;
   send a corresponding multiple second write transactions from the cache pipeline to the memory for each bulk store operation to perform a bulk initialization of the memory for each bulk store operation; and
   track status of the bulk store operations, wherein the cache pipeline in the last level cache is configured to maintain cache coherence in a hierarchy of caches in the computer system responsive to receiving each first write transaction and prior to sending the corresponding second write transaction to the memory.

2. The computer system of claim 1, wherein:
   the load store unit comprises a bulk store combine buffer; and
   the load store unit is configured to store status of the bulk store operations in the bulk store combine buffer.

3. The computer system of claim 1 wherein the load store unit is further configured to:
   send the bulk store operations directly to the last level cache while bypassing the internal cache.

4. The computer system of claim 1, wherein the load store unit is further configured to:
   track bulk store operations that are pending, wherein each bulk store operation is associated with a region of the memory to be initialized; and
   block younger loads associated with any region of the memory associated with any pending bulk store operation.

5. The computer system of claim 1, wherein:
   the load store unit comprises a bulk store combine buffer; and
   the load store unit is configured to either set pending status for a bulk store operation to complete or remove the bulk store operation from the bulk store combine buffer in response to the last level cache indicating that the bulk store operation is complete.

6. The computer system of claim 1, wherein:

the last level cache is further configured to store information on intact status associated with each bulk store operation, the intact status indicates whether a region of the memory initialized by a bulk store operation is intact with initialization values; and the last level cache is further configured to set the intact status to not intact responsive to another processor core writing to a region of the memory associated with a bulk store operation.

7. The computer system of claim 6, wherein:

the load store unit comprises a bulk store combine buffer; and the load store unit is further configured to:

invalidate an entry for a first bulk store operation in the bulk store combine buffer responsive to the intact status indicating that the status is not intact; and maintain a corresponding entry for a second bulk store operation as a valid entry in the bulk store combine buffer responsive to the intact information indicating that the status is intact.

8. The computer system of claim 1, wherein the load store unit is further configured to:

respond to a younger load instruction that loads from a region of the memory initialized by a bulk store operation that is complete by providing known initialization values if the region is still intact.

9. The computer system of claim 1, wherein each bulk store operation initializes a region of the memory to all zeroes.

10. The computer system of claim 1, wherein each second write transaction initializes a region of the memory that has a size of a cache line.

11. The computer system of claim 1, wherein each bulk store operation initializes a region of the memory that has a size of a page.

12. The computer system of claim 1, further comprising logic configured to:

create a single bulk store operation from a plurality of store instructions that each are configured to initialize a cache line sized region in the memory.

13. The computer system of claim 1, wherein the cache pipeline is further configured to remove all copies of a cache line responsive to receiving each of the first write transactions and before issuing a corresponding second write transaction to the memory.

14. A method of initializing a memory in a computer system, the method comprising:

receiving, at a last level cache in a hierarchy of caches in the computer system, a bulk store operation from a load store unit in a processor core in the computer system;

performing a bulk initialization of the memory for each bulk store operation, including:

sending multiple first write transactions to a cache pipeline in the last level cache for each bulk store operation; and sending a corresponding multiple second write transactions from the cache pipeline to the memory for each bulk store operation; and tracking status of the bulk store operations; and maintaining cache coherence in the hierarchy of caches when performing the bulk initialization of the memory for each bulk store operation, including the cache pipeline maintaining cache coherence in response to receiving each first write transaction and prior to sending the corresponding second write transaction to the memory.

15. The method of claim 14, wherein sending the multiple first write transactions to the cache pipeline for each bulk store operation comprises:

sending multiple WriteUnique transactions to the cache pipeline in the last level cache.

16. The method of claim 14, further comprising:

tracking bulk store operations that are pending, wherein each bulk store operation is associated with a region of the memory to be initialized; and blocking younger loads associated with any region of the memory associated with any pending bulk store operation.

17. A computer system for initializing memory, the computer system comprising:

main memory;

a central processing unit;

a load store unit, the load store unit comprising load store unit means for tracking status of page store operations, each page store operation including a physical address in the main memory; and a hierarchy of caches comprising a last level cache;

the last level cache comprises first means for maintaining cache coherence in the hierarchy of caches when initializing a page of the main memory for each page store operation;

the last level cache comprising second means for sending multiple first write transactions to the first means for each page store operation;

the first means further for sending a corresponding multiple second write transactions to the main memory to initialize the page of the main memory; and the last level cache comprising third means for tracking status of the page store operations and reporting the status to the load store unit, wherein the first means is further for maintaining cache coherence in the hierarchy of caches responsive to receiving each first write transaction and prior to sending the corresponding second write transaction to the main memory.

18. The computer system of claim 17, wherein each page store operation initializes a page of the main memory to all zeroes.

* * * * *